US010201020B2

(12) United States Patent
McCoy et al.

(10) Patent No.: US 10,201,020 B2
(45) Date of Patent: Feb. 5, 2019

(54) MULTI-USER RANDOM ACCESS PROCEDURES FOR MASSIVE MIMO WIRELESS COMMUNICATION SYSTEMS

(71) Applicant: National Instruments Corporation, Austin, TX (US)

(72) Inventors: James Wesley McCoy, Leander, TX (US); Nikhil U. Kundargi, Austin, TX (US); Karl F. Nieman, Jr., Austin, TX (US); Lothar Wenzel, Harlingen, TX (US); Marcus Monroe, Cedar Park, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 15/708,664

(22) Filed: Sep. 19, 2017

(65) Prior Publication Data

US 2018/0084586 A1 Mar. 22, 2018

Related U.S. Application Data

(60) Provisional application No. 62/396,272, filed on Sep. 19, 2016.

(51) Int. Cl.
*H04W 74/08* (2009.01)
*H04W 72/04* (2009.01)
*H04B 7/0456* (2017.01)
*H04B 7/0452* (2017.01)

(52) U.S. Cl.
CPC ...... *H04W 74/0833* (2013.01); *H04B 7/0452* (2013.01); *H04B 7/0456* (2013.01); *H04W 72/042* (2013.01)

(58) Field of Classification Search
CPC ............ H04W 74/0833; H04W 72/042; H04B 7/0452
See application file for complete search history.

(56) References Cited

U.S. PATENT DOCUMENTS 8,325,755 B2 12/2012 Lee et al.
9,191,161 B2 11/2015 Li et al.
(Continued)

OTHER PUBLICATIONS

Vieira et al., "*Reciprocity Calibration Methods for Massive MIMO Based on Antenna Coupling*", Department of Electrical Engineering, Lund University, Jan. 1, 2014, pp. 1-6.
(Continued)

*Primary Examiner* — Christopher M Brandt
(74) *Attorney, Agent, or Firm* — E. Alan Davis; James W. Huffman

(57) ABSTRACT

A system and method for performing multi-user random access procedures in a mobile telecommunications network between a base station and a user equipment (UE) having a plurality of antennas includes transmitting a random access signal set (RASS) message using one or more antennas of the plurality of UE antennas. In response to receiving the RASS message, the base station transmitting a random access response physical downlink control channel (RAR-PDCCH) message. In response to receiving the RAR-PDCCH message, transmitting a reciprocity reference signal set (RRSS) signal using the plurality of UE antennas.

24 Claims, 5 Drawing Sheets

(56) References Cited

U.S. PATENT DOCUMENTS

| | | | | |
|---|---|---|---|---|
| 2010/0117890 | A1* | 5/2010 | Vook | H04B 17/21 |
| | | | | 342/174 |
| 2010/0150013 | A1* | 6/2010 | Hara | H04L 25/0224 |
| | | | | 370/252 |
| 2013/0039319 | A1* | 2/2013 | Shi | H04L 5/0023 |
| | | | | 370/329 |
| 2014/0269502 | A1* | 9/2014 | Forenza | H04B 17/12 |
| | | | | 370/328 |
| 2015/0223231 | A1* | 8/2015 | Noh | H04L 5/0048 |
| | | | | 370/329 |
| 2015/0326286 | A1 | 11/2015 | Wong et al. | |
| 2015/0326291 | A1 | 11/2015 | Wong et al. | |
| 2015/0326383 | A1 | 11/2015 | Wong et al. | |
| 2016/0269157 | A1* | 9/2016 | Soriaga | H04L 5/0048 |
| 2016/0269159 | A1* | 9/2016 | Soriaga | H04L 5/0048 |
| 2016/0308624 | A1* | 10/2016 | Rong | H04B 7/024 |
| 2017/0290013 | A1 | 10/2017 | McCoy et al. | |
| 2017/0331577 | A1* | 11/2017 | Parkvall | H04J 11/0079 |
| 2018/0006743 | A1* | 1/2018 | Zhu | H04L 1/20 |
| 2018/0007707 | A1* | 1/2018 | Rico Alvarino | H04L 5/0096 |
| 2018/0213570 | A1* | 7/2018 | Moon | H04W 74/0833 |

OTHER PUBLICATIONS

Harris et al., "*University of Bristol and Lund University Partner with NI to Set World Records in 5G Wireless Spectral Efficiency Using Massive MIMO*", dowloaded from www.ni.com, May 2016, pp. 1-7.

"*LTE in a Nutshell—Physical Layer*", Telesystem Innovations Inc. White Paper, 2010, pp. 1-10.

"*An Introduction to Orthogonal Frequency Division Multiplex Technology*", Keithley Instruments, Inc., 2008, pp. 1-66.

Huawei, "WF on CSI Acquisition in NR", 3GPP TSG RAB WG1 Meeting #85, May 23-27, 2016, pp. 1-4.

Huawei et al., "*WF on CSI Acquisition Framework in NR*", 3GPP TSG RAN WG1 Meeting #85, May 23-27, 2016, pp. 1-3.

"*Study on Latency Reduction Techniques for LTE*", 3GPP TR 36.881 Vo.6.0 Technical Report, Feb. 2016, pp. 1-92.

"*Study on Scenarios and Requirements for Next Generation Access Technologies*", 3GPP TR 38.913 Vo.2.0, Feb. 2016, pp. 1-19.

Vieira et al., "*A Flexible 100-Antenna Testbed for Massive MIMO*", Department of Electrical Information Technology at Lund University, Jan. 1, 2014, pp. 1-7.

"Bristol and Lund Set a New World Record in 5G Wireless Spectrum Efficiency" Bristol Univeristy, News, March: Massive MIMO demonstration, Mar. 23, 2016, pp. 1-6.

"Study on NR New Radio Access Technology", 3GPP TSG RAN Meeting #71, Goteborg, Sweden, Mar. 7-10, 2016, pp. 1-8.

"*LTE Small Cell Enhancement by Dual Connectivity*", Wireless World Research Forum, Outlook Visions and Research Directions for the Wireless World, Whitepaper, Nov. 2014, pp. 1-22.

"*LTE in a Nutshell: Protocol Architecture*" Telesystem Innovations Inc. White Paper, 2010, pp. 1-12.

"*LTE Random Access Procedure*" http://www.eventhelix.com/eventstudio/, Jul. 28, 2017, pp. 1-5.

Luther, "*5G Massive MIMO Testbed: From Theory to Reality*", National Instruments, Jun. 8, 2016, pp. 1-11.

"*Introduction to the NI mmWave Transceiver System Hardware*", National Instruments, Apr. 20, 2016, pp. 1-8.

"National Instruments Wireless Research Handbook", National Instruments, May 2016, pp. 1-37.

Shepard et al. "*Argos: Practical Many-Antenna Base Stations*" MobiCom 12, Aug. 22-26, 2012, Istanbul, Turkey, pp. 53-64.

Khoolenjani, et al. "*Distribution of the Ratio of Normal and Rice Random Variables*" Digital Commons @WayneState, *Journal of Modern Applied Statistical Methods*, vol. 12, Issue 2, Article 27, Nov. 1, 2013, pp. 1-15.

Shen et al. "*Channel Estimation in OFDM Systems*", Freescale Semiconductor, Inc. Application Note, Jan. 2006, pp. 1-16.

"Constant Amplitude Zero Autocorrelation Waveform", Wikipedia, Downloaded from https://en.wikipedia.org/wiki/Constant_Amplitude_zero_autocorrelation_waveform&oldid=693419237 on Sep. 14, 2016, p. 1.

"Zadoff-Chu Sequence", Wikipedia, downloaded from https://en.wikipedia.org/wiki/Zadoff%E2%80%93Chu_sequence on Sep. 14, 2016, pp. 1-3.

* cited by examiner

MULTI-USER RA MIMO LAYERS great US 10,201,020 B2

MULTI-USER RANDOM ACCESS PROCEDURES FOR MASSIVE MIMO WIRELESS COMMUNICATION SYSTEMS

This application claims the benefit of U.S. Provisional Application No. 62/396,272, filed on Sep. 19, 2016 which is hereby incorporated by reference in its entirety as though fully and completely set forth herein.

BACKGROUND

Technical Field.

The disclosed embodiments relate to mobile telecommunications.

The New Radio (NR) definition in 3GPP ($3^{rd}$ Generation Partnership Project) for mobile systems will encompass a variety of deployment scenarios envisioned for 5G (fifth generation) mobile communication systems. MIMO (multiple input, multiple output) communication systems can be used for 5G TDD (time division duplex) air interfaces. In particular, massive MIMO reciprocity-based TDD air interfaces allow for symbol-level switching and potential configurability that in turn allow for features to support various aspects of 5G air interfaces, for example, enhanced Mobile BroadBand (eMBB), massive Machine Type Communications (mMTC) and Ultra-Reliable and Low Latency Communications (URLLC).

Beamforming in massive MIMO communication systems is based upon the time reversal property of electromagnetic waves. The wireless channels used for such MIMO communications are typically reciprocal in the UL (uplink) direction and the DL (downlink) direction. One use of this reciprocity is to reuse the UL channel estimate for DL precoding to gain a significant reduction in channel estimation overhead as compared to an alternative option of sending DL pilots from each DL antenna port and receiving the CSI/PMI (channel state information/precoding matrix index) feedback on the UL channel. This use of reciprocity is an attractive feature for large antenna count MIMO scenarios.

FIG. 1 (Prior Art) is a diagram of an example embodiment for channel reciprocity associated with a base station 102 with M antennas 104 that provides a wireless MIMO communication system 100. The MIMO base station 102 communicates through its M antennas 104 with K different user equipment (UE) devices 106, such as mobile handsets, that each have only a single antenna 108. Based on electromagnetic properties, ideal channel reciprocity for a wireless communication channel between one of the base station antennas 104 and one of the UE antennas 108 will provide that the uplink (UL) channel and the downlink (DL) channel will have identical responses. As shown in FIG. 1, the DL channel response ($DLH_{m,k}$) from a base station antenna (m) 104 to a UE antenna (k) 108 will match the return UL channel response ($ULh_{k,m}$) from the same UE antenna (k) 108 to the same base station antenna (m) 104. Over time (T), therefore, the overall DL channel response ($H_{DL}$) will also match the overall UL channel response ($H_{UL}$).

Spectral efficiency is improved by using massive MIMO communication systems having base stations with relatively large numbers of antennas. For example, spectral efficiency can be improved from about 30 bps/Hz (bits-per-second per Hertz) for current LTE systems to about 145.6 bps/Hz for MIMO communication systems. Example embodiments for massive MIMO communication systems and related reciprocity-based TDD air interfaces are described within U.S. Published Patent Application 2015/0326286, entitled "MASSIVE MIMO ARCHITECTURE," U.S. Published Patent Application 2015/0326383, entitled "SYNCHRONIZATION OF LARGE ANTENNA COUNT SYSTEMS," and U.S. Published Patent Application 2015/0326291, entitled "SIGNALING AND FRAME STRUCTURE FOR MASSIVE MIMO CELLULAR TELECOMMUNICATION SYSTEMS," each of which is hereby incorporated by reference in its entirety.

In current LTE (long term evolution) cellular communication systems, the LTE control protocol requires up to four of fourteen (14) symbols or time-frequency resources be allocated to a PDCCH (Physical Downlink Control Channel) that is monitored by UEs to determine control information transmitted from a base station, such as an eNodeB (eNB) within the LTE standard. For the current LTE protocol, all UE control messages are sent by base stations using this PDCCH as a common control channel. Further, in addition to using only a single antenna for radio access signaling, current UEs also transmit SRS (sounding reference signal) signals using a single UE antenna.

Current LTE protocols also use higher network communication layers (e.g., Layer 3) to implement initial access procedures for UEs connecting to a base station (e.g. eNB). For varied multi-user environments such as 5G, however, these higher layer communications assume a common control channel (e.g., PDCCH), as indicated above, along with a common data channel (e.g., PDSCH—Physical Downlink Shared Channel). As such, LTE initial access protocols are not easily applied to 5G solutions and/or massive MIMO communication systems. For example, Massive MIMO communication systems have previously been demonstrated to support up to twelve (12) channels or more of multi-user MIMO (MU-MIMO) communications. However, the current common control channel (PDCCH) for the LTE access protocol would be overwhelmed by the amount of control resources required to support this MU-MIMO.

SUMMARY

Multi-user random access procedures are disclosed for UE (user equipment) initial access in massive MIMO (multiple input, multiple output) communication systems. Concurrent access requests are supported from multiple UEs, and each UE can communicate access signaling using multiple antennas. Further, a variety of embodiments can be implemented while still taking advantage of the multi-user random access MIMO techniques described herein.

In some embodiments, a method for performing multi-user random access procedures in a mobile telecommunications network between a base station and a user equipment (UE) having a plurality of antennas includes transmitting a random access signal set (RASS) message using one or more antennas of the plurality of UE antennas. In response to receiving the RASS message, the base station transmitting a random access response physical downlink control channel (RAR-PDCCH) message. In response to receiving the RAR-PDCCH message, transmitting a reciprocity reference signal set (RRSS) signal using the plurality of UE antennas.

In some embodiments, a user equipment (UE) performs multi-user random access procedures with a base station in a mobile telecommunications network. The UE includes a plurality of antennas. The UE also incudes transmit/receive circuitry that transmits a random access signal set (RASS) message using one or more of the plurality of UE antennas, receives from the base station a random access response physical downlink control channel (RAR-PDCCH) message, and in response to receiving the RAR-PDCCH message, transmits a reciprocity reference signal set (RRSS) signal using the plurality of UE antennas.

In some embodiments, a base station performs multi-user random access procedures with a user equipment (UE) having a plurality of antennas in a mobile telecommunications network. The base station includes transmit/receive circuitry that receives a random access signal set (RASS) message from the UE transmitted by one or more antennas of the plurality of UE antennas and in response transmits a random access response physical downlink control channel (RAR-PDCCH) message. The circuitry also receives a reciprocity reference signal set (RRSS) signal from the UE transmitted by the plurality of UE antennas.

DESCRIPTION OF THE DRAWINGS

It is noted that the appended drawings illustrate only exemplary embodiments and are, therefore, not to be considered limiting of the scope of the present inventions, for the inventions may admit to other equally effective embodiments.

DETAILED DESCRIPTION

Terms

Figure 1:
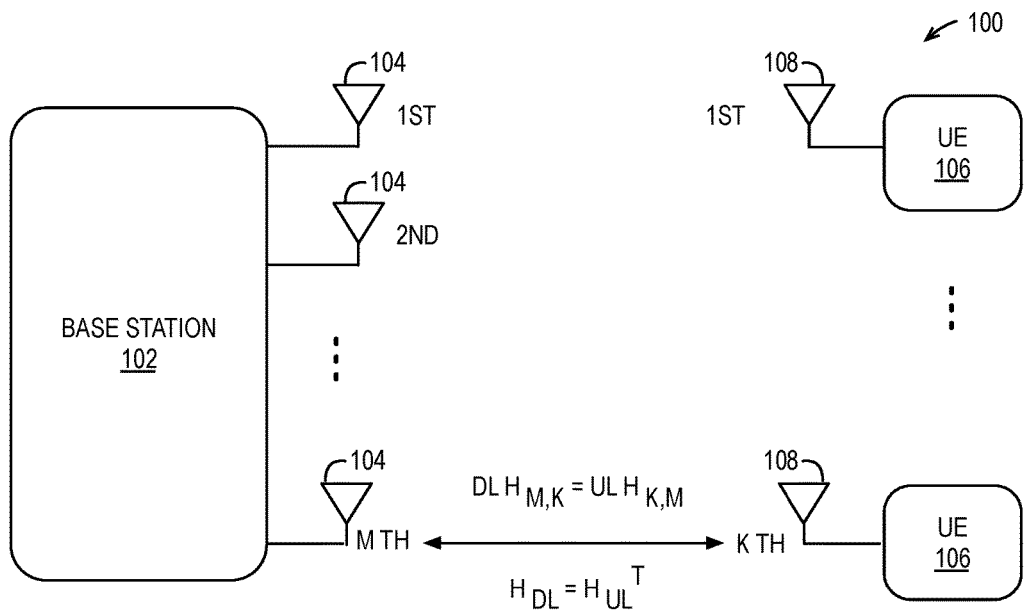
FIG. 1 (Prior Art) is a diagram of an example embodiment for channel reciprocity associated with a base station with M antennas that provides a wireless MIMO communication system.

A random access radio network temporary identifier (RA-RNTI) is a random identifier (ID) selected by a UE for purposes of initial access.

A random access signal set (RASS) message is a randomly selected set of Zadoff-Chu (ZC) resources to be transmitted over one or more antennas.

A random access response physical downlink control channel (RAR-PDCCH) message is the response of a base station to a successfully received RASS message. It addresses the UE from which the message was received by its RA-RNTI.

A reciprocity reference signal set (RRSS) is a set of reference signal transmitted by one UE to set up reciprocity-based communication.

A multi-user physical downlink control channel (MU-PDCCH) message is a beamformed control channel.

The term base station is intended to be interpreted according to its well-understood meaning, which includes a wireless communication station installed at a fixed location and used to communicate as part of a wireless telephone system or radio system. A base station has one or more antennas, and the antennas may be closely co-located (e.g., on a single panel) or not closely co-located (e.g., on multiple panels, multiple buildings).

The term user equipment (UE) is intended to be interpreted according to its well-understood meaning, which includes any of various types of computer system devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™) laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Multi-user random access procedures are disclosed for UE (user equipment) initial access in massive MIMO (multiple input, multiple output) communication systems. Concurrent access requests are supported from multiple UEs, and each UE can communicate access signaling using multiple antennas. Further, a variety of embodiments can be implemented while still taking advantage of the multi-user random access MIMO techniques described herein.

The embodiments described herein in part use multi-user control channels to provide multi-user random access procedures for initial access by UE (user equipment) to base stations for massive MIMO communication systems. For example, a MU-PDCCH (Multi-User Physical Downlink Control Channel) can be enabled and used to allow massive MIMO systems to be fully enabled within the NR (New Radio) specification. In addition, the multi-user random access procedures described herein can be reciprocity-based in order to allow a precoder to be implemented for the communications associated with the MU-PDCCH.

Figure 2:
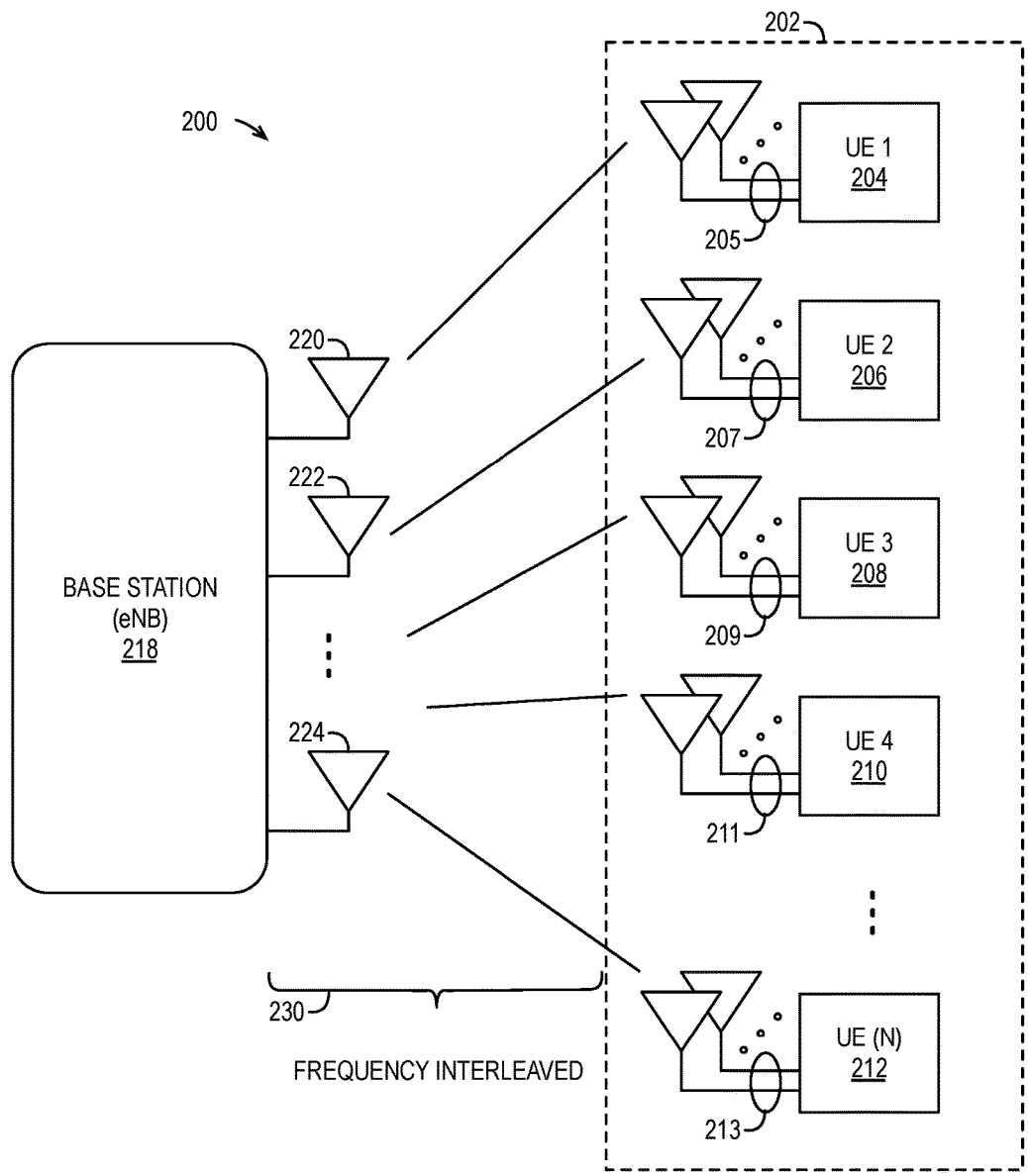
FIG. 2 is a diagram of an example embodiment for a massive MIMO communication system including a base station (e.g., eNodeB) and multiple UEs (user equipment) requesting access to the MIMO communication system through the base station.

FIG. 2 is a diagram of an example embodiment 200 for a massive MIMO communication system including a base station (e.g., eNB, gNB (next Generation Node B, or gNodeB)) 218 and multiple UEs 202 requesting access to the MIMO communication system through the base station 218. The base station 218 uses multiple antennas 220, 222 . . . 224 to transmit and receive messages with the multiple UEs 202. In contrast with prior solutions, each UE also uses multiple antennas to transmit and receive messages with the base station 218. For example, a first UE (UE1) 204 transmits/receives using multiple antennas 205. A second UE (UE2) 206 transmits/receives using multiple antennas 207. A third UE (UE3) 208 transmits/receives using multiple antennas 209. A fourth UE (UE4) 210 transmits/receives using multiple antennas 211. This continues and the Nth UE (UE(N)) 212 transmits/receives using multiple antennas 213.

It is noted that concurrent communications between the UEs 202 and the base station 218 can be interleaved 230 in the frequency domain such that each UE 204, 206, 208, 210 . . . 212 uses a portion of a frequency spectrum. For one example embodiment, up to six (6) UEs can concurrently communicate with the base station 218 at one time using frequency domain interleaving 230 of ⅙ for each the UEs 202. For such an embodiment, if additional concurrent UE communications are needed, additional time-frequency resources can be allocated to the UEs, for example, to support more than six (6) concurrent UE communications. It also noted that one or more UEs could also communicate with the base station 218 using a single antenna along with multiple UEs that use multiple antennas. Other variations can also implemented while still taking advantage of the multi-user random access techniques described herein.

The embodiments described herein use additional channels or signals added to existing LTE protocols in order to support full capabilities of multi-user random access procedures for massive MIMO communication systems. These additional channels or signals include: (1) a RASS (random access signal set) layer, (2) a RAR-PDCCH (random access response PDCCH) layer, (3) a RRSS (reciprocity reference signal set) layer, and (4) a MU-PDCCH layer (multi-user PDCCH).

The RASS is a set of access signals or messages that are transmitted by UEs and received by base stations such as eNodeB devices in LTE networks. The RASS messaging is configured to support multiple antenna ports per UE and to support concurrent LTE RASS communications from multiple UEs transmitting to a base station. Where ZC (Zadoff-Chu) sequences are used, each of the antenna ports for a UE can also be configured to support a different cyclic shift of the same ZC root sequence as part of the RASS signaling. It is also noted that different root sequences can be used by the different antennas instead of cyclic shifts. It is further noted that a combination of different root sequences and cyclic shifts can also be used by the different antennas. As indicated above, frequency domain interleaving can also be used as part of the RASS messaging to support the different concurrent access communications from the multiple UEs. In addition, a RA-RNTI (random-access radio network temporary identifier) is also selected by each UE and transmitted as part of the RASS messaging. It is also noted that additional and/or different signals or messages can also be implemented as part of the RASS.

As described herein, where the UE is using multiple antennas for MIMO access, the RA-RNTI is distributed through the multiple antennas during the RASS signaling. In contrast, for current LTE protocols, the RA-RNTI is only output by a single UE antenna.

The base station (e.g., eNB, gNB) can be configured to determine the number of antennas at any particular UE through blind detection based upon the RASS signaling. For example, the base station can use one or more ML (maximum likelihood) detection algorithms to determine the number of antennas being used by any particular UE.

The RAR-PDCCH is a common control channel for base station control transmissions. As such, all UEs monitor this channel, and the RAR-PDCCH is shared by the multiple UEs for the initial access to the base station (e.g., eNB, gNB). The RAR-PDCCH is used to indicate the desired uplink transmission rank (e.g., detected rank or number of antennas for the UE), to indicate the uplink resources to be used for RRSS signaling by the UE, to indicate coding sequences (e.g., ZC sequences) to be used for RRSS signaling by the UE, and to echo back the RA-RNTI sent by the UE. The RAR-PDCCH can also include additional information. In contrast to prior uses of a PDCCH channel in the LTE protocol, the RAR-PDCCH includes only random access responses (RARs) transmitted by the base station, thereby effectively limiting the PDCCH messaging available in traditional LTE access procedures and thereby creating the RAR-PDCCH signaling described herein. A small set of ordinary PDCCH common control messages may be sent in addition to the RAR-PDCCH.

The RRSS signals are communicated by UEs to set up MU-PUSCH (multi-user physical uplink shared channel) signaling along with other associated start-up signaling. For example, information can be transmitted such as the capabilities for the UE, the type of message being communicated by the UE, the purpose of the messaging, and/or other information. Other channels can also be set up such as PUCCH (physical uplink control channel) signaling. Further, several UEs can simultaneously communicate the PUSCH and/or PUCCH set-up messaging.

Once the RASS, RAR-PDCCH, and RRSS access procedures have completed, the MU-PDCCH is enabled and is used to provide UE-specific control messages targeted at specific UE devices. The MU-PDCCH can also be reciprocity-based. The MU-PDCCH is beamformed to an individual UE.

As one example embodiment, the multi-user random access procedures are configured to support up to six (6) UEs that are concurrently communicating RRSS signals at the same time. For this example embodiment, each of the UEs can also use up to eight (8) antennas with each antenna using a different ZC root sequence with the same cyclic shift, the same ZC root sequence with different cyclic shifts, or a combination of ZC root sequences and cyclic shifts. It is noted that UEs having eight (8) antenna use eight (8) different root sequences; UEs having four (4) antennas use four (4) different root sequences; and UEs having two (2) antennas would use two (2) different root sequences. UEs having one (1) antenna can also perform initial access using the techniques described herein but would use one root sequence. The same root sequence differentiation approach for different antennas can also be used for RASS messages, and as indicated above different cyclic shifts can also be used with a single root sequence as well as combinations of different root sequences and different cyclic shifts. The base station can be configured for blind detection of number of antennas (e.g., rank) for the transmitting UEs. For example, the base station can perform ZC correlation with only 8, 4, 2, or 1 root sequences and/or cyclic shifts and related energy detection in order to detect the number of antennas being used. The presence of energy in a given bin or set of bins indicates the number of antennas, where a bin represents a ZC sequence with a given root or "u" value. In one embodiment, the set of root sequences are selected so that they do not overlap in the frequency domain thereby increasing detection probability. Further, a long cyclic prefix (e.g., about 70% to 100%) can also be used for random access channels (RACHs) such that 100% overlap is guaranteed between sequences thereby simplifying detection and estimation. For example, if MIMO communications are assumed to use 1600 subcarriers only occupying every sixth subcarrier, then 266 or 267 length sequences can be used. If cyclic extension are then used, a length of 263 sequences can be used for detection where 263 is noted prime. However, the full 266/267 length can still be used for estimation because the polyphase property can be used to determine the CAZAC (constant amplitude zero auto-correlation) property. As such, the full benefit of ZC cross-correlation properties is available for detection, and the full benefit of CAZAC properties are also available for estimation at every bin.

Figure 3:
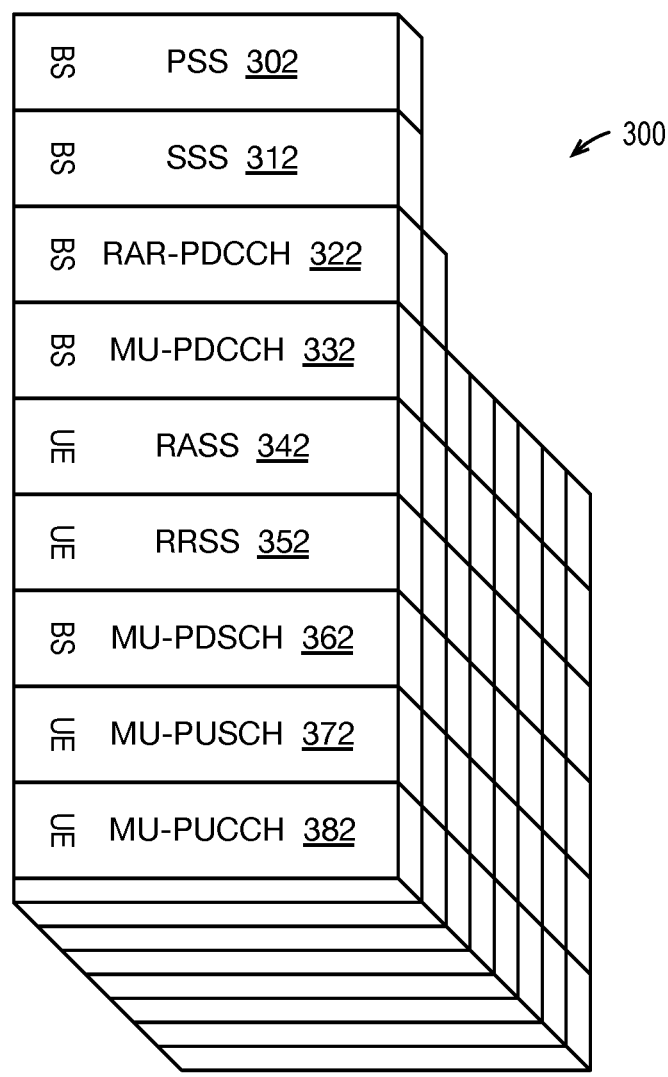
FIG. 3 is a diagram of an example embodiment for multi-user random access (RA) MIMO layers including a RASS layer, a RAR-PDCCH layer, an RRSS layer, and a MU-PDCCH layer.

FIG. 3 is a diagram of an example embodiment 300 for multi-user random access (RA) MIMO layers. For this embodiment, the base station communicates within a single PSS (primary synchronization signal) channel 302 and a single SSS (secondary synchronization signal) channel 312 to UEs as part of the initial synchronization according to the current LTE protocol. The base station also communicates with the UEs using two RAR-PDCCH channels 322, eight MU-PDCCH channels 332, and eight MU-PDSCH (multi-user physical downlink shared channels) channels 362. The UEs also communicate with the base station using an eight-channel RASS 342, an eight-channel RRSS 352, eight MU-PUSCH channels 372, and eight MU-PUCCH channels 382. It is noted that embodiment 300 is simply one example embodiment and different numbers of spatial channels can be used while still taking advantage of the multi-user random access techniques described herein.

Figure 4:
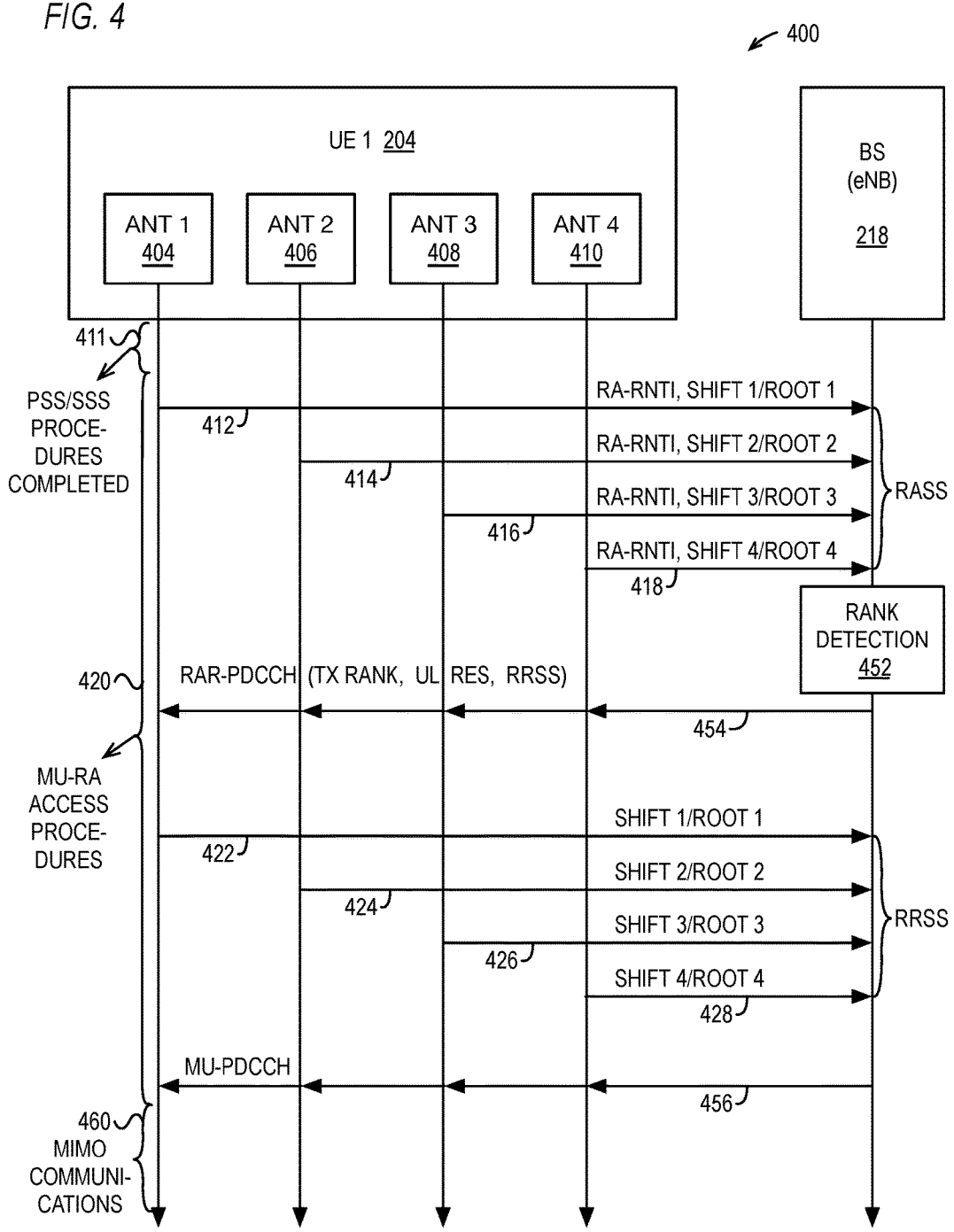
FIG. 4 is a diagram of an example embodiment for multi-user random access procedures between a UE having four (4) antennas and a base station within a multi-user random access (RA) MIMO communication system.

FIG. 4 is a diagram of an example embodiment 400 for multi-user random access procedures between a UE 204 having four (4) antennas and a base station 218 within a multi-user random access (RA) MIMO communication system. It is noted that one or more other UEs could also concurrently perform similar initial access procedures at the same time. UE 204 is simply being used as an example UE requesting access to the base station 218. It is also noted that additional base stations could also receive the messaging signals being transmitted by the UEs. Other variations could also be implemented while still taking advantage of the multi-user random access techniques described herein.

It is also noted that the communications in embodiment 400 assume that initial synchronization procedures 411 for the UE 204 with the base station 218 have already occurred using PSS and SSS signaling. Further, it is assumed that the UE 204 has also received MIB (master information block) and SIB (system information block) messages from the base station 218 as part of the initial synchronization procedures 411. These messages could also be provided in the same way as LTE, in the BCH (broadcast channel) and PDSCH (physical downlink shared channel), respectively. The messages shown provide subsequent access procedures 420 for multi-user random access to the base station 218 within the massive MIMO communication system.

First, the UE 204 performs a random access request by transmitting a RASS message using its antennas, which includes four antennas 404, 406, 408, and 410 in the example embodiment depicted in FIG. 4. The UE 204 also randomly selects an RA-RNTI (random access radio network temporary identifier) to help identify a set of ZC root sequence for the RASS messaging. The UE 204 uses the first antenna (ANTI) 404 to transmit a first portion of the RASS message 412 that includes the selected RA-RNTI, and this transmission includes a first shift (SHIFT1) for the ZC sequence. The UE 204 uses the second antenna (ANT2) 406 to transmit a second portion of the RASS message 414 that includes the RA-RNTI, and this transmission includes a second shift (SHIFT2) for the ZC sequence. The UE 204 uses the third antenna (ANT3) 408 to transmit a third portion of the RASS message 416 that includes the RA-RNTI, and this transmission includes a third shift (SHIFT3) for the ZC sequence. The UE 204 uses the fourth antenna (ANT4) 410 to transmit a fourth portion of the RASS message 418 that includes the RA-RNTI, and this transmission includes a fourth shift (SHIFT4) for the ZC sequence. It is again noted that different root sequences (ROOT1, ROOT2, ROOT3, ROOT4) could also be used for the RASS messaging through the multiple antennas instead of a single root sequence and different cyclic shifts. Further, it is again noted that combinations of different root sequences and different cyclic shifts could also be used for messaging through the different antennas.

The base station 218 receives the RASS message 412, 414, 416, and 418 from the UE 204. The base station 218 obtains the RA-RNTI from the RASS message. Further, the base station 218 can be configured to determine the rank or number of antennas for UE 204 from the RASS message 412, 414, 416, and 418. This rank detection 452 can be made, for example, using an ML (maximum likelihood) decoder. It is noted that the multi-user random access procedures described herein can also be implemented without using this rank detection.

The base station 218 then responds to the RASS message by transmitting a RAR-PDCCH message 454 which is a common control channel monitored by all UEs including UE 204. The RAR-PDCCH is also not multi-user precoded. The RAR-PDCCH includes information to indicate the transmit (TX) rank for the base station (i.e., number of antennas for the base station 218), the uplink (UL) resources to be used by the UE 204, and the RRSS signal to be used for the UE 204. The RRSS signal can include, for example, ZC root sequences, cyclic shifts for the ZC root sequences, frequency interleaving and/or other transmission signaling modes for the UE 204 to use in subsequent transmissions. For one example implementation, the RRSS transmissions can be interleaved in the frequency domain up to a factor of six (6). Other variations can also be implemented.

The UE 204 then transmits RRSS signals using its antennas. The UE 204 uses the first antenna (ANTI) 404 to transmit a first portion of the RRSS signal 422 with a first shift (SHIFT1) for the ZC root sequence. The UE 204 uses the second antenna (ANT2) 406 to transmit a second portion of the RRSS signal 424 with a second shift (SHIFT2) for the ZC root sequence. The UE 204 uses the third antenna (ANT3) 408 to transmit a third portion of the RRSS signal 426 with a third shift (SHIFT3) for the ZC root sequence. The UE 204 uses the fourth antenna (ANT4) 410 to transmit a fourth portion of the RRSS signal 428 with a fourth shift (SHIFT4) for the ZC root sequence. The RRSS signal can also include information to set up subsequent PUSCH (physical uplink shared channel) messaging and/or PUCCH (physical uplink control channel) messaging. The PUSCH and PUCCH can also be configured as multi-user channels that can be used by other UEs. It is again noted that different root sequences (ROOT1, ROOT2, ROOT3, ROOT4) could also be used for the RRSS messaging through the multiple antennas instead of a single root sequence and different cyclic shifts. Further, it is again noted that combinations of different root sequences and different cyclic shifts could also be used for messaging through the different antennas.

The base station 218 then transmits a MU-PDCCH message 456 that is received by the UE 204. The MU-PDCCH channel is dedicated to one or a subset of the UEs in a cell. As indicated above, the control messages sent by base station 218 through the MU-PDCCH are directed to a specific UE even though the channel is monitored by all UEs. MIMO communications 460 can now freely occur between the UE 204 and the base station 218 using higher dimension capabilities of the massive MIMO communication system.

As indicate above, example embodiments for massive MIMO communication systems and related reciprocity-based TDD air interfaces are described within U.S. Published Patent Application 2015/0326286, entitled "MASSIVE MIMO ARCHITECTURE," U.S. Published Patent Application 2015/0326383, entitled "SYNCHRONIZATION OF LARGE ANTENNA COUNT SYSTEMS," and U.S. Published Patent Application 2015/0326291, entitled "SIGNALING AND FRAME STRUCTURE FOR MASSIVE MIMO CELLULAR TELECOMMUNICATION SYSTEMS," each of which is hereby incorporated by reference in its entirety.

Figure 5:
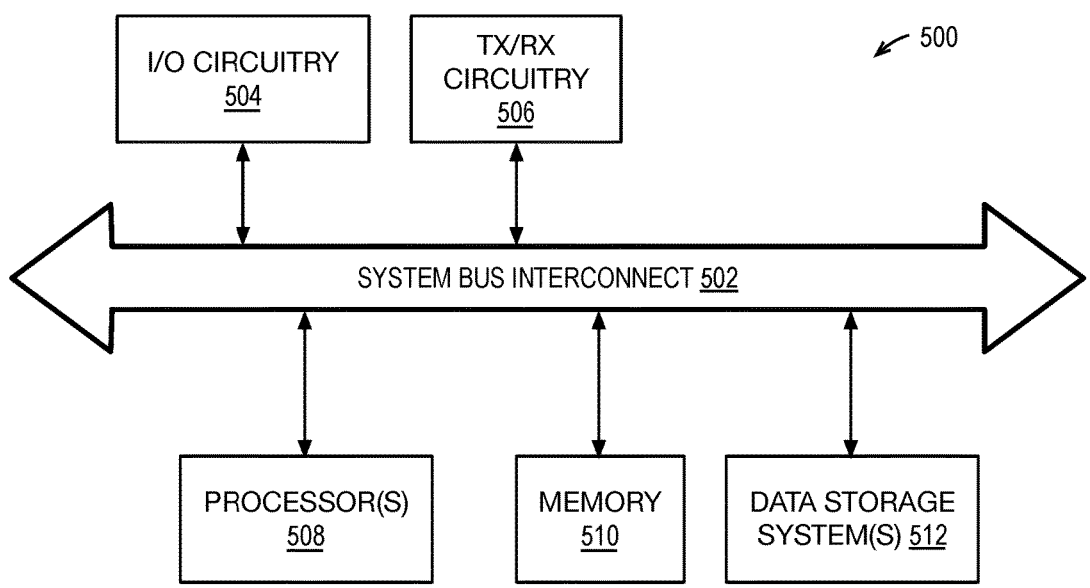
FIG. 5 is a diagram of an example embodiment for electronic components that can be used to implement a base station and/or user equipment (UE) for the disclosed embodiments.

FIG. 5 is a diagram of an example embodiment 500 for electronic components that can be used to implement a base station 218 and/or user equipment (UE) 202. For the example embodiment 500 shown in FIG. 5, one or more processors 508 communicate with other components through system bus interconnect 502. For example, the one or more processors 508 communicate with input/output (I/O) circuitry 504 and transmit/receive (TX/RX) circuitry 506 through the system bus interconnect 502. Additional circuitry can also be included such as power supply circuitry and/or other desired circuitry. The TX/RX circuitry 506 provides one or more cellular radios and are preferably coupled to a plurality of antennas through which the TX/RX circuitry transmits and receives RF (radio frequency) signals (e.g., from a few kHz to 10 GHz and above). The I/O circuitry 504 provides one or more interfaces for users, such as graphical user interfaces, and/or connections to peripheral devices (e.g., displays, keyboards, mice, point device, and/or other I/O peripheral devices). The memory 510 is also coupled to the system bus interconnect 502 and can be used by the one or more processors 508 to load and/or store instructions, data, and/or other information during operation. One or more data storage device(s) 512 are also connected to the system bus interconnect 502 and can store software or program instructions and/or other desired data or information for the operation of the processing system. For example, computer-readable instructions stored in the data storage devices 512 can be loaded within the memory 510 and then executed by the processor(s) 508 to carry out the functions described herein.

It is noted that different and/or additional components from those depicted in FIG. 5 could also be used to implement one or more radio systems for the embodiments described herein while still taking advantage of the multi-user random access techniques described herein. It is further noted that the system bus interconnect 502 can be implemented as multiple interconnection buses with our without additional intervening circuitry such as routing or switching circuitry. Further, the processor(s) 508 can be implemented using one or more programmable integrated circuits including controllers, microcontrollers, microprocessors, hardware accelerators, configurable logic devices (e.g., field programmable gate arrays), and/or other programmable integrated circuits that are programmed to carry out the function described herein. Further, the one or more processor(s) 508 can execute instructions stored in a non-transitory tangible computer-readable medium to perform the functions described herein. In addition, data storage device(s) 512 can be implemented as any desired non-transitory tangible medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory 510 can be any data storage medium configured to maintain data storage when powered. Other variations could also be implemented.

It is also noted that the functional blocks described herein can be implemented using hardware, software, or a combination of hardware and software, as desired. In addition, one or more processors or processing circuitry running software and/or firmware can also be used, as desired, to implement the disclosed embodiments. It is further understood that one or more of the operations, tasks, functions, or methodologies described herein may be implemented, for example, as software or firmware and/or other program instructions that are embodied in one or more non-transitory tangible computer readable mediums (e.g., memory) and that are executed by one or more controllers, microcontrollers, microprocessors, hardware accelerators, and/or other processors or processing circuitry to perform the operations and functions described herein.

It is further noted that the functional blocks, devices, and/or circuitry described herein can be implemented using hardware, software, or a combination of hardware and software. In addition, one or more processors (e.g., central processing units (CPUs), controllers, microcontrollers, microprocessors, hardware accelerators, programmable integrated circuitry, FPGAs (field programmable gate arrays), ASICs (application specific integrated circuits), and/or other programmable processing circuitry) can be programmed to perform the operations, tasks, functions, or actions described herein for the disclosed embodiments. For example, the one or more electronic circuits can be configured to execute or otherwise be programmed with software, firmware, logic, and/or other program instructions stored in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) to perform the operations, tasks, functions, or actions described herein for the disclosed embodiments.

It is still further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the wireless communication system massive MIMO multi-user random access procedure techniques described herein.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

The invention claimed is:

1. A method for performing multi-user random access procedures in a mobile telecommunications network between a base station and a user equipment (UE) having a plurality of antennas, the method comprising:
   transmitting a random access signal set (RASS) message using one or more antennas of the plurality of UE antennas;
   in response to receiving the RASS message:
      transmitting, by the base station, a random access response physical downlink control channel (RAR-PDCCH) message; and
   in response to receiving the RAR-PDCCH message:
      transmitting a reciprocity reference signal set (RRSS) signal using the plurality of UE antennas.

2. The method of claim 1, further comprising:
   in response to receiving the RRSS signal:
      transmitting, by the base station, a multi-user physical downlink control channel (MU-PDCCH) message.

3. The method of claim 1,
   wherein the mobile telecommunications network includes a plurality of UE each having a plurality of antennas; and
   wherein for each UE of the plurality of UE:
      the UE performs a respective instance of said transmitting a RRSS signal using the plurality of UE antennas.

4. The method of claim 3,
   wherein said transmitting the RRSS signal using the plurality of UE antennas is performed concurrently by the plurality of UE in a frequency domain interleaved manner.

5. The method of claim 1,
   wherein the RASS message includes a random access radio network temporary identifier (RA-RNTI) selected by the UE.

6. The method of claim 1, further comprising:
   wherein the RRSS signal comprises a plurality of Zadoff-Chu (ZC) sequences transmitted by respective ones of the plurality of UE antennas.

7. The method of claim 6,
   wherein each ZC sequence of the plurality of ZC sequences comprises a different cyclic shift for each antenna of the plurality of UE antennas.

8. The method of claim 6,
   wherein each ZC sequence of the plurality of ZC sequences comprises a different ZC root sequence for each antenna of the plurality of UE antennas.

9. The method of claim 6,
   wherein each ZC sequence of the plurality of ZC sequences comprises a different combination of cyclic shift and ZC root sequence for each antenna of the plurality of UE antennas.

10. The method of claim 1, further comprising:
    determining, by the base station, a number of the plurality of antennas of the UE from the received RASS message.

11. The method of claim 1,
    wherein the RAR-PDCCH message is not multi-user precoded.

12. The method of claim 1,
    wherein the RAR-PDCCH message includes information to indicate one or more of:
       a desired uplink transmission rank;
       uplink resources to be used for RRSS signaling by the UE;
       coding sequences to be used for RRSS signaling by the UE; and
       a random access radio network temporary identifier (RA-RNTI) received from the UE in the RASS message.

13. The method of claim 1, further comprising:
    wherein the RASS message comprises one or more Zadoff-Chu (ZC) sequences transmitted by respective ones of the one or more UE antennas.

14. The method of claim 1,
    wherein the RRSS includes signaling to set up one or more of subsequent:
       physical uplink shared channel (PUSCH) messaging; and
       physical uplink control channel (PUCCH) messaging.

15. A user equipment (UE) that performs multi-user random access procedures with a base station in a mobile telecommunications network, the UE comprising:
    a plurality of antennas; and
    transmit/receive circuitry configured to:
       transmit a random access signal set (RASS) message using one or more of the plurality of UE antennas;
       receive, from the base station, a random access response physical downlink control channel (RAR-PDCCH) message; and
       in response to receiving the RAR-PDCCH message:
          transmit a reciprocity reference signal set (RRSS) signal using the plurality of UE antennas.

16. The UE of claim 15,
    wherein the transmit/receive circuitry is further configured to:
       receive, from the base station, a multi-user physical downlink control channel (MU-PDCCH) message.

17. The UE of claim 15,
    wherein the transmit/receive circuitry transmits the RRSS signal in a frequency domain interleaved manner with a plurality of other UEs of the mobile telecommunications network each configured to concurrently transmit an RRSS signal.

18. The UE of claim 15,
    wherein the RASS message includes a random access radio network temporary identifier (RA-RNTI) selected by the UE.

19. The UE of claim 15,
wherein the RRSS signal comprises a plurality of Zadoff-Chu (ZC) sequences transmitted by respective ones of the plurality of UE antennas; and
wherein each ZC sequence of the plurality of ZC sequences comprises an arrangement according to one of the following list:
  each ZC sequence of the plurality of ZC sequences comprises a different cyclic shift for each antenna of the plurality of UE antennas;
  each ZC sequence of the plurality of ZC sequences comprises a different ZC root sequence for each antenna of the plurality of UE antennas; and
  each ZC sequence of the plurality of ZC sequences comprises a different combination of cyclic shift and ZC root sequence for each antenna of the plurality of UE antennas.

20. A base station that performs multi-user random access procedures with a user equipment (UE) having a plurality of antennas in a mobile telecommunications network, the base station comprising:
  transmit/receive circuitry configured to:
    receive a random access signal set (RASS) message from the UE transmitted by one or more antennas of the plurality of UE antennas;
    in response to receiving the RASS message:
      transmit a random access response physical downlink control channel (RAR-PDCCH) message; and
    receive a reciprocity reference signal set (RRSS) signal from the UE transmitted by the plurality of UE antennas.

21. The base station of claim 20,
wherein the transmit/receive circuitry is further configured to, in response to receiving the RRSS signal:
  transmit a multi-user physical downlink control channel (MU-PDCCH) message.

22. The base station of claim 20,
wherein the transmit/receive circuitry is configured to receive the RRSS signal from the UE in a frequency domain interleaved manner with a plurality of other UEs of the mobile telecommunications network that each concurrently transmit an RRSS signal.

23. The base station of claim 20, further comprising:
a processor configured to determine a number of the plurality of antennas of the UE from the received RASS message.

24. The base station of claim 20,
wherein the RAR-PDCCH message is not multi-user precoded.

* * * * *